(12) United States Patent
Fortin

(10) Patent No.: US 8,596,565 B2
(45) Date of Patent: Dec. 3, 2013

(54) LEAF STRIPPER

(75) Inventor: Marc Fortin, Quebec (CA)

(73) Assignee: 105766 Canada Inc., Morin Heights (CA)

( * ) Notice: Subject to any disclaimer, the term of this patent is extended or adjusted under 35 U.S.C. 154(b) by 365 days.

(21) Appl. No.: 13/110,729

(22) Filed: May 18, 2011

(65) Prior Publication Data

US 2012/0291411 A1   Nov. 22, 2012

(51) Int. Cl.
*B02C 13/00* (2006.01)
*B02C 17/02* (2006.01)
*B02C 4/06* (2006.01)

(52) U.S. Cl.
USPC ............... 241/81; 241/83; 241/92; 241/282.1

(58) Field of Classification Search
USPC ..................... 241/81, 83, 92, 282.1, 282.2
See application file for complete search history.

(56) References Cited

U.S. PATENT DOCUMENTS

| | | | |
|---|---|---|---|
| 3,190,566 A | 6/1965 | Cressy, W.P. et al. | |
| 3,593,930 A | 7/1971 | Lautzenheiser | |
| 3,706,189 A | 12/1972 | Rutherford | |
| 4,360,166 A | 11/1982 | Biersack | |
| 4,472,929 A * | 9/1984 | MacCanna et al. | 56/327.1 |
| 4,477,029 A | 10/1984 | Green | |
| 4,595,148 A | 6/1986 | Luerken et al. | |
| 4,682,740 A | 7/1987 | Conigliaro et al. | |
| 4,778,117 A | 10/1988 | Karg | |
| 4,984,747 A | 1/1991 | Lechner | |
| 5,020,309 A | 6/1991 | Hopkins | |
| 5,085,375 A | 2/1992 | Haworth | |
| 5,215,267 A | 6/1993 | Taylor | |
| 5,385,308 A * | 1/1995 | Gearing et al. | 241/101.78 |
| 5,474,241 A | 12/1995 | Kennedy | |
| 6,343,754 B1 * | 2/2002 | Snow | 241/100 |
| 6,658,833 B2 | 12/2003 | Dunning et al. | |
| 7,096,654 B2 * | 8/2006 | Pellenc | 56/330 |
| 7,138,271 B2 | 11/2006 | Pratte | |
| 7,168,643 B2 | 1/2007 | Mercier | |
| 7,490,787 B1 * | 2/2009 | Salazar | 241/62 |
| 7,654,480 B2 | 2/2010 | Baer et al. | |
| 7,837,751 B2 | 11/2010 | Dunning et al. | |
| 7,971,813 B2 * | 7/2011 | O'Leary et al. | 241/60 |
| 2002/0189221 A1 | 12/2002 | Morabit et al. | |

(Continued)

FOREIGN PATENT DOCUMENTS

| | | |
|---|---|---|
| CA | 2485336 | 11/2002 |
| CA | 2 470 370 | 10/2004 |

(Continued)

OTHER PUBLICATIONS

"Big Red Shredder", www.betterthannature.com/catalog/product_info.php?products_id=483, Aug. 11, 2003.

*Primary Examiner* — Faye Francis
(74) *Attorney, Agent, or Firm* — Cameron IP

(57) ABSTRACT

The present invention relates to a leaf stripper for removing leaves from a plant. The leaf stripper includes a housing having an interior. The stripper has a grille supported by the housing and in communication with the interior. The grille is shaped to selectively enable the leaves to at least partially pass therethrough. The stripper has a stripping motor disposed within the interior of the housing and supported by the housing. The stripper has a rotatable string member operatively connected to the stripping motor. The string member is configured to create a partial vacuum within the interior of the housing for at least partially sucking the leaves through the grille when rotated and to at least partially shred the leaves at least partially passing through the grille.

11 Claims, 10 Drawing Sheets

(56) References Cited

U.S. PATENT DOCUMENTS

2006/0123635 A1 6/2006 Hurley
2007/0193240 A1 8/2007 Nafziger
2007/0271896 A1 11/2007 Bonny et al.

FOREIGN PATENT DOCUMENTS

| | | |
|---|---|---|
| CA | 2470370 | 10/2004 |
| CA | 2560505 A1 | 9/2005 |
| CH | 694311 A5 | 11/2004 |
| DE | 2931564 | 2/1981 |
| EP | 0278607 A1 | 8/1988 |
| EP | 0894429 A1 | 7/1998 |
| FR | 2390084 | 5/1977 |
| FR | 2483168 | 5/1980 |
| WO | WO 97/33461 | 9/1997 |
| WO | WO 97/44998 | 12/1997 |
| WO | WO 02/091863 | 11/2002 |

\* cited by examiner

LEAF STRIPPER

FIELD OF THE INVENTION

The present invention relates to strippers. In particular, the invention relates to a leaf stripper.

DESCRIPTION OF THE RELATED ART

U.S. Pat. No. 7,168,643 to Mercier discloses a leaf stripper machine having a grille frame below which is disposed a rotatable cutting blade for cutting leaves. The stripper includes a vane, as shown in FIG. 6 of Mercier, extending from the blade and configured to create a vacuum for sucking leaves through the grille frame.

Canadian Patent No. 2,485,336 to Bonny et al. discloses a leaf stripper machine having a grille frame below which is disposed a rotatable knife for cutting leaves. The stripper includes a turbine configured to suck leaves through the grille frame and eject the leaves outwards and away from the stripper.

Each of the above machines may suffer disadvantages. For example, the machines may suffer the disadvantage of having plant parts and resin adhere to the cutting blades. In such cases this may inhibit the suctioning and cutting ability and thus operation of the machine. Such machines may need to be regularly cleaned and it may be relatively time-consuming to have to stop operation of the machine to clean the blades before continuing.

The use of blades per se may be dangerous if one's fingers accidentally touch the blades while the machine is in operation. The need to insert one's hands into the machine shown by Bonny et al. to where the turbine is located to further clean the machine of trapped leaves may render this operation very dangerous if someone was to turn power back on by accident. If an object such as a metal object is dropped through the grill, the blades might cut it and send shredded metal parts flying through the air, yet further increasing the risks of injury to the operator.

These machines may be relatively difficult to operate. For example, the operator may be required to rotate the plant along the grille with one hand while putting pressure on the plant with the other hand. The use of the turbine in the machine shown in Bonny et al. may cause a relatively large amount of noise, rendering it more difficult for the operator of the machine to hear or communicate.

These machines may be relatively onerous to maintain. The machine shown in Bonny et al. may have a checker plate and a collector bag connected to its turbine, and leaves may get trapped within the machine's checker plate. In such cases, the collector bag must be removed in addition to the checker plate in order to clear said trapped leaves. Blades need to be periodically sharpened and in such cases, the machines may need to be fully disassembled in order to access the blades.

The cutting and suctioning aspects of these machines require a relatively large number of parts.

Each of the above machines may be limited in their adjustability, which may otherwise be useful to accommodate different varieties of plant species whose leaves are to be stripped.

There is accordingly a need for a leaf stripper that overcomes the above and other disadvantages of the known prior art.

BRIEF SUMMARY OF INVENTION

The present invention provides a leaf stripper disclosed herein that overcomes the above disadvantages. It is an object of the present invention to provide an improved leaf stripper.

There is accordingly provided a leaf stripper for removing leaves from a plant. The leaf stripper includes a housing having an interior. The stripper has a grille supported by the housing and in communication with the interior. The grille is shaped to selectively enable the leaves to at least partially pass therethrough. The stripper has a stripping motor disposed within the interior of the housing and supported by the housing. The stripper has a rotatable string member operatively connected to the stripping motor. The string member is configured to create a partial vacuum within the interior of the housing for at least partially sucking the leaves through the grille when rotated and to at least partially shred the leaves at least partially passing through the grille.

There is also provided a leaf stripper for removing leaves from a plant. The leaf stripper includes a housing having an interior, a top, a tumbler portion adjacent the top, a bottom opposite the top and a stripping portion disposed below the tumbler portion. The stripper has a grille disposed within the interior of the housing and supported by the housing. The grille is disposed between the tumbler portion and the stripping portion. The grille is shaped to selectively enable the leaves to at least partially pass therethrough. The stripper has a rotatable tumbler member disposed within the tumbler portion of the housing. The tumbler member is configured to tumble portions of the plant around the grille. The stripper has a stripping motor supported by the housing and disposed in the stripping portion of the housing. The stripper has a rotatable cutting member connected to the stripping motor. The cutting member is configured to create a partial vacuum within the stripping portion of the housing for causing the leaves to be at least partially sucked through the grille from the tumbler portion of the housing to the stripping portion of the housing when rotated. The cutting member is also configured to at least partially shred the leaves so at least partially sucked through the grille.

There is further provided a leaf stripper for removing leaves from a plant. The leaf stripper includes a housing having an interior, a top, a tumbler portion adjacent the top, a bottom opposite the top, an output opening extending through the housing and a stripping portion adjacent to the bottom. The stripper has a grille disposed within the interior of the housing and supported by the housing. The grille is disposed in a generally horizontal plane between the tumbler portion and the stripping portion of the housing. The grille is shaped to selectively enable the leaves to at least partially pass therethrough. The output opening is aligned with the grille and the tumbler portion of the housing. The stripper has a tumbler motor mounted to the top of the housing. The stripper has a rotatable, radially extending, elongate tumbler member operatively connected to the tumbler motor and disposed within the interior of the housing. The tumbler member has at least one aperture extending therethrough. The tumbler member is configured to tumble portions of the plant around the grille. The stripper has a stripping motor supported by the housing and disposed in the stripping portion of the housing. The stripper has a motor cooling fan connected to the stripping motor. The motor cooling fan is configured to cool the stripping motor. The stripper has a rotatable, flexible monofilament line operatively connected to the stripping motor. The flexible monofilament line is configured to create a partial vacuum within the stripping portion of the housing for causing the leaves to be at least partially sucked through the grille from the tumbler portion of the housing to the stripping portion of the housing when rotated. The flexible monofilament line is also configured to shred the leaves. The stripper has an output gate covering the output opening and through which portions of the plant that are at least partially removed of leaves may be retrieved.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
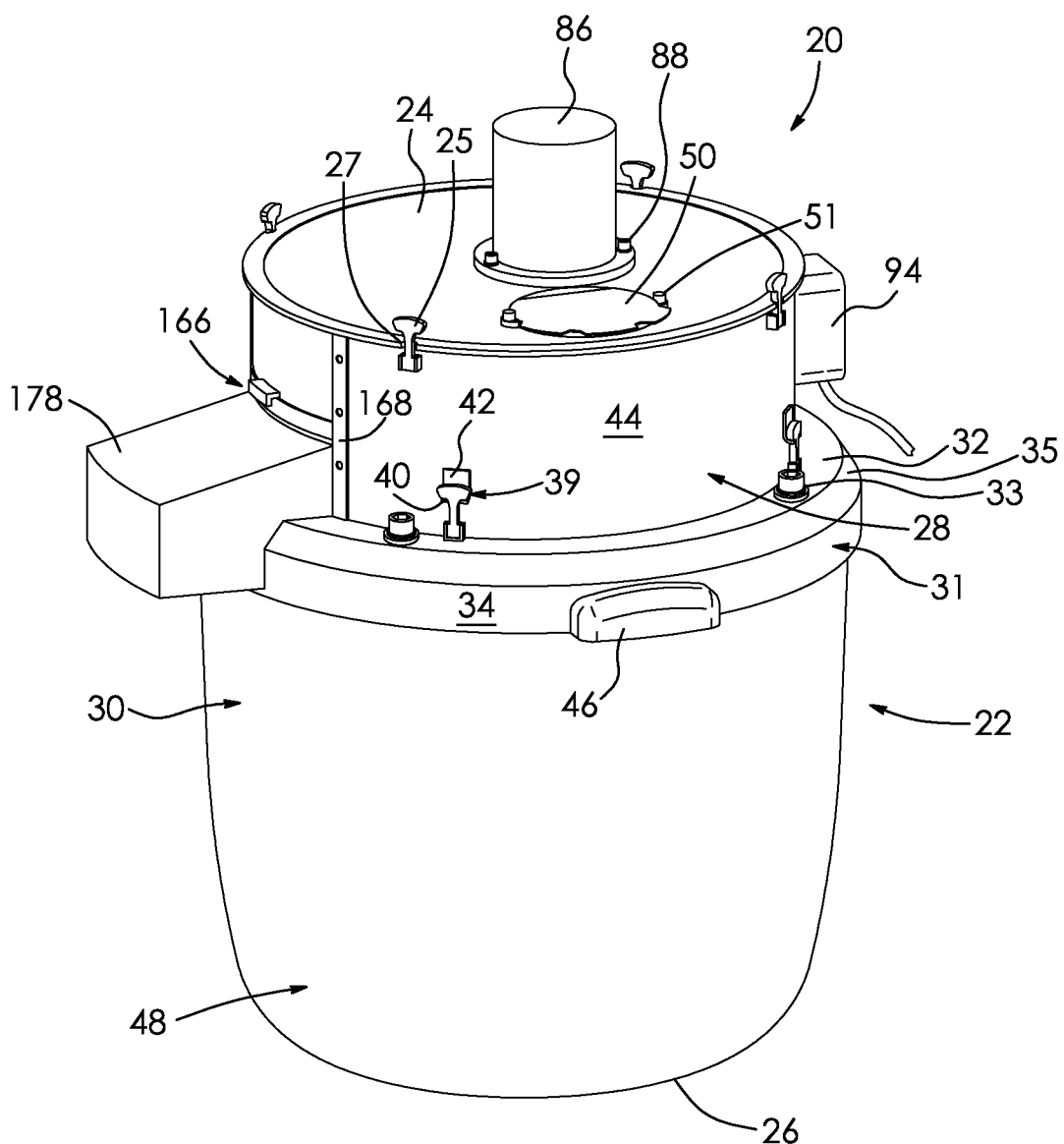
FIG. 1 is a perspective view of a leaf stripper according to a first embodiment.
Figure 2:
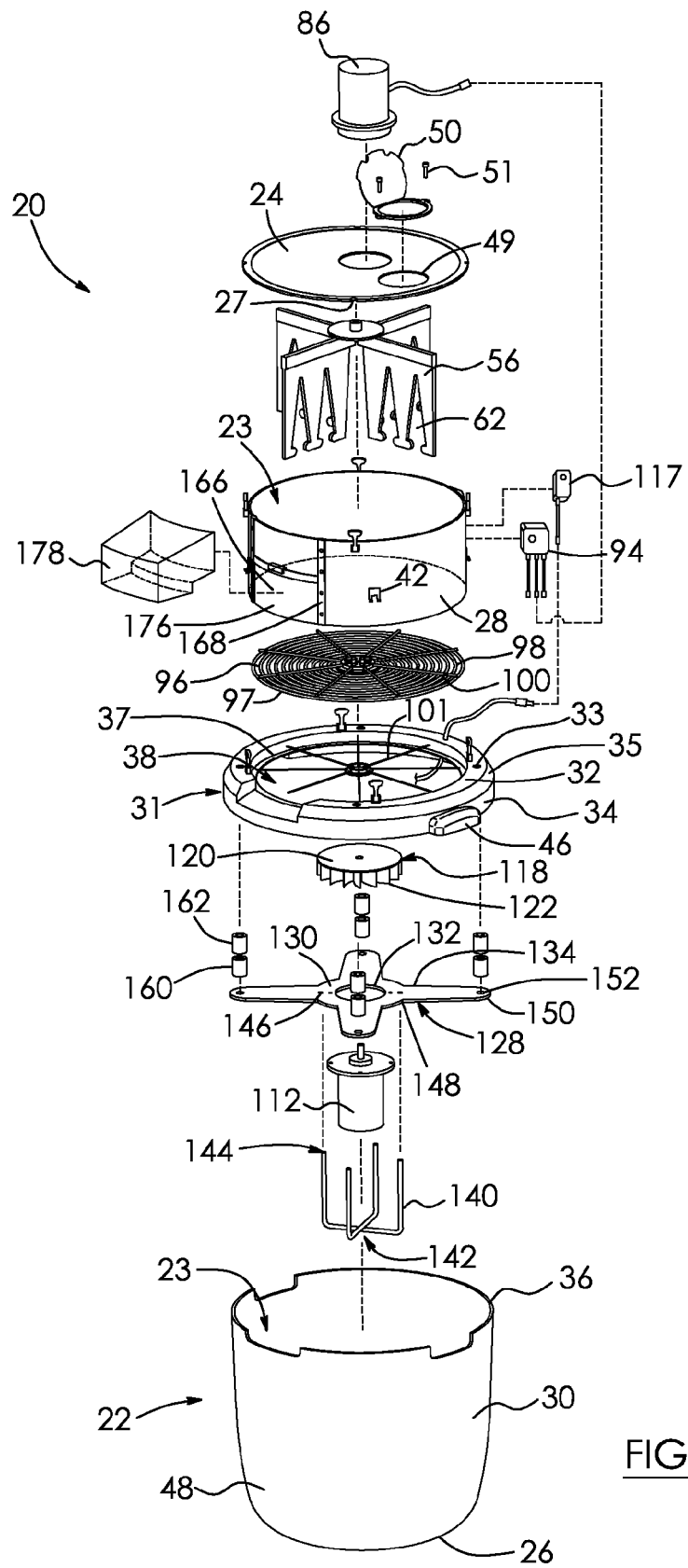
FIG. 2 is an exploded, disassembled perspective view of the leaf stripper shown in FIG. 1.

Referring to the drawings and first to FIG. 1, there is shown a leaf stripper 20 for removing leaves from a plant. The leaf stripper has a housing 22. The housing is generally cylindrical and made of PVC in this example, with an interior 23 as shown in FIG. 2, a closed top 24 and bottom 26 opposite the top. Housing 22 has a tumbler portion 28 adjacent the top 24. Referring to FIG. 1, top 24 connects to the tumbler portion 28 via pivotable fasteners 25, which are connected to and extend from the tumbler portion 28. The fasteners may be actuated to selectively engage peripheral grooves 27 of the top 24. Put another way, the fasteners may be flipped upwards so as to engage with the grooves 27 and readily lock the top 24 in place.

Housing 22 includes a stripping portion 30 adjacent to and disposed below the tumbler portion 28. The housing includes a flange 31, as shown in FIGS. 1 and 2, interposed between tumbler portion 28 and stripping portion 30. The flange has a top 32 facing and extending around tumbler portion 28, with a plurality of radially spaced-apart apertures 33 extending therethrough. Flange 31 has an annular side 34 and an angled wall 35 interposed between and connecting together top 32 and side 34. Referring to FIG. 2, wall 35 is configured to rest upon and engage with exterior end 36 of the stripping portion 30. Flange 31 also has an annular shoulder 37 offset relative to top 32 and upon which the tumbler portion 28 rests and engages. The flange 31 has a central opening 38, which shoulder 37 encircles.

As shown in FIG. 1, the flange 31 also connects to the tumbler portion 28 via pivotable fasteners 39. The fasteners are connected to and extending from the flange 31. Fasteners 39 may be actuated to selectively engage apertures 40 of brackets 42. Brackets 42 are in the form of wire loops and are connected to and extend from the exterior 44 of the tumbler portion 28. The fasteners may be flipped upwards to engage brackets 42 and readily lock flange 31 to tumbler portion 28 of the housing. The leaf stripper may thus be used as a work station without the tumbler portion 28, and parts connected thereto, if desired by the operator. The fasteners of the leaf stripper ensure that the stripper may be easily and quickly dismantled for cleaning.

Housing 22 includes handles 46 extending outwards from the side 34 of flange 31 for selectively removing the flange and tumbler portion of the housing from the stripping portion of the housing. The housing further includes a cylindrical-shaped composting portion 48 adjacent to the housing's bottom 26. The composting portion is configured to collect partially shredded leaves and promote composting of the partially shredded leaves.

Figure 3:
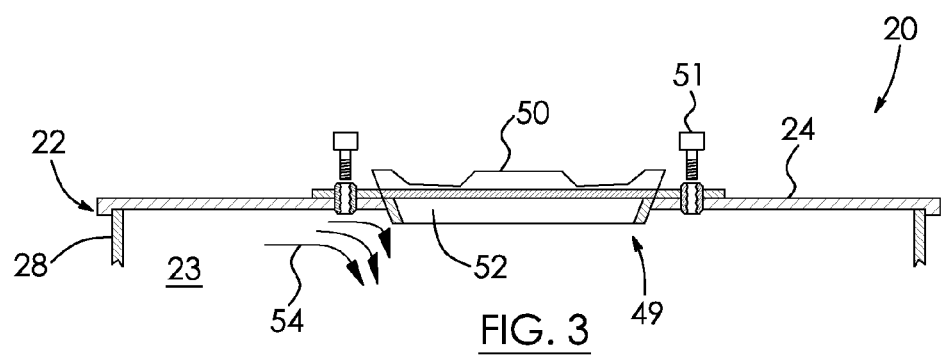
FIG. 3 is a cross-sectional, partially broken-away elevation view of the top of the housing of the leaf stripper of FIG. 1, a tumbler portion of the housing shown partially broken away and fitted with the top of the housing, and a hinged gate of the stripper shown in more detail.

As shown in FIG. 2, the leaf stripper 20 includes a feed opening 49 extending through the top 24 of the housing. Plants whose leaves are to be removed may be selectively inserted through the opening 49 upon a feeder cover, in this example, a hinged gate 50, being opened. The gate is mounted to the top 24 via bolts 51. As shown in FIG. 3, gate 50 has a protruding collar 52 disposed within the interior 23 of the housing 22. The collar is configured to deflect eddy currents downwards, as indicated by the arrow of numeral 54, which causes plant material disposed adjacent to the top 24 of the housing to be propelled downwards.

Figure 4:
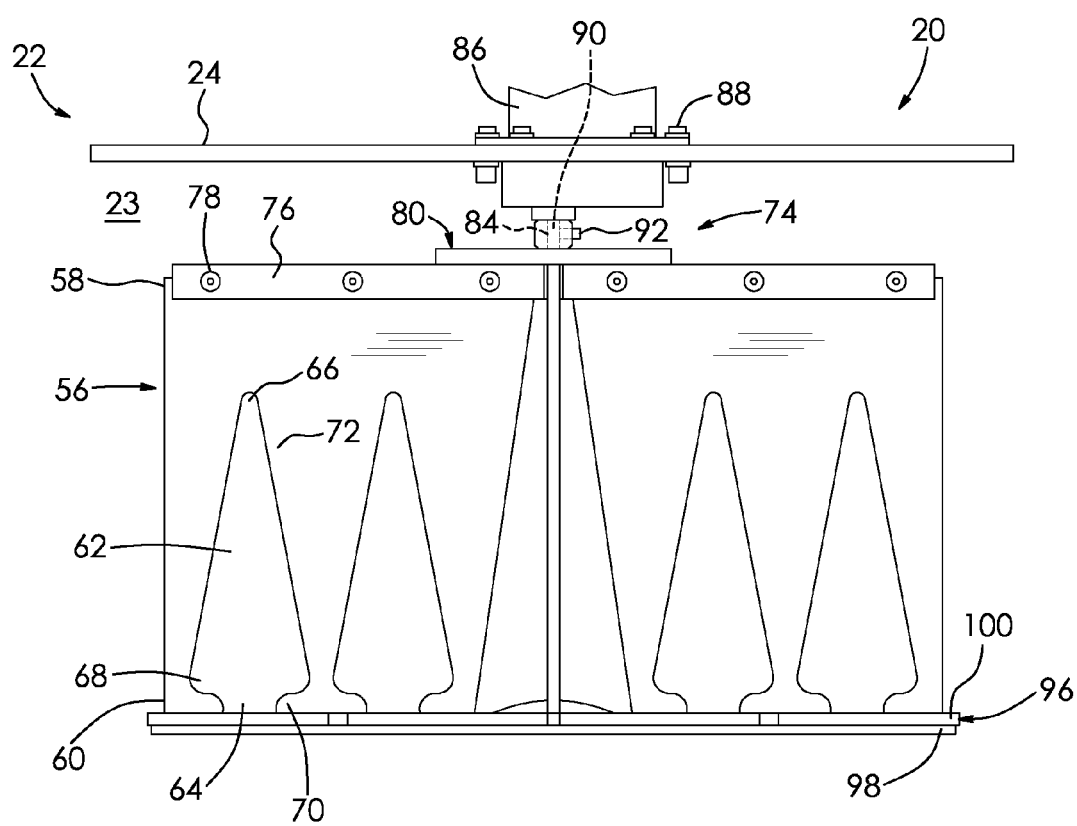
FIG. 4 is an elevation view of the top of the housing of the stripper, the interior of part of the housing, a grille, a tumbler motor partially broken away and a plurality of tumbler members of the leaf stripper shown in FIG. 1, with the tumbler portion of the housing being removed.

As best shown in FIG. 4, leaf stripper 20 has a plurality of rotatable, radially extending and spaced-apart, elongate tumbler members 56 disposed within the tumbler portion 28 of the housing and disposed within the interior 23 of the housing. There are four tumbler members in this example, as best shown in FIG. 2, each of which has a rectangular, panel-like shape and a length approximately equal to the radius of the grille 96. The tumbler members are configured to tumble the plant around and within the tumbler portion 28 of the housing. Referring back to FIG. 4, each tumbler member 56 has a first end 58 adjacent to the top 24 of the housing and a second end 60 opposite the first end. The second end 60 is adjacent to the stripping portion 30 of the housing shown in FIG. 2.

Each tumbler member 56 has at least one aperture and in this example has a pair of triangular-shaped or Christmas-tree-shaped apertures 62. The apertures 62 are shaped to selectively enable portions of the plant to pass therethrough. The apertures have first ends 64 disposed adjacent to the stripping portion 30 of the housing and second ends 66 opposite thereof. The apertures are wider at their first ends 64 relative to their second ends 66. Apertures 62 include intermediate sections 68 interposed between and wider than ends 64 and 66. The tumbler members have lobe portions 70 disposed between and adjacent to end 64 and section 68. The lobe portions are shaped to deflect and tumble the plant upwards relative to FIG. 4. Triangle-shaped portions 72 of the tumbler member 56 between and adjacent to section 68 and end 66 are tapered outwardly towards end 58 of the tumbler member and are configured to deflect and tumble the plant downwards relative to FIG. 4.

The tumbler members 56 in this example are made of rubber and are connected together and held in place via a frame 74. The frame has a plurality of radially extending, elongate bars 76 configured to connect with the first ends 58 of respective ones of the tumbler members 56 via rivets 78. The bars 76 connect to a centrally disposed hub 80. Hub 80 has a central aperture 84.

Referring back to FIG. 1, the leaf stripper 20 includes a tumbler motor 86 mounted to the top 24 of the housing 22 via bolts 88. Referring to FIG. 4, the tumbler members 56 are mounted to the motor 86. In particular, shaft 90 of the tumbler motor is disposed within aperture 84 of the hub 80 and fixed in place via a set screw 92 configured to pass through the hub and engage shaft 90. The tumbler members 56 are thus releasably connected to the tumbler motor 86.

As shown in FIG. 1, the leaf stripper 20 includes a power and speed controller or speed adjusting means 94 for controlling the speed at which the motor 86 rotates the tumbler members 56. In this case, the speed of the motor is adjusted by adjusting the current or voltage fed to the motor, though this is not strictly required and other ways of adjusting motor speed are possible. Controller 94 is conventional and incorporates off-the shelf components. The controller provides speed control, and has a plastic casing from Kraloy Canada, a 2.5 amp unit disposed therein from Canarm and a Dayton model capacitor disposed therein. Controller 94 will therefore not be described in further detail.

Figure 10:
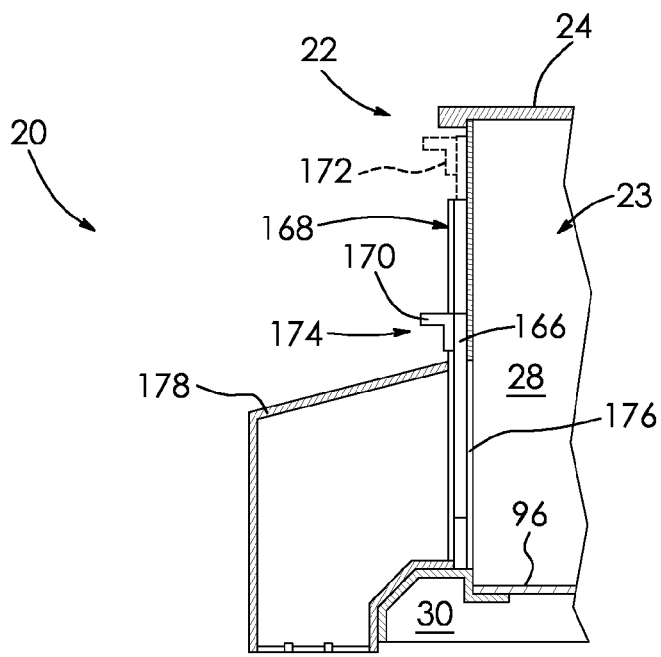
FIG. 10 is a fragmentary, cross-sectional elevation view of the leaf stripper of FIG. 1, showing the tumbler portion, an outlet gate and a chute of the leaf stripper.

As seen in FIG. 2, the leaf stripper includes grille 96. The grille is supported by the housing 22 and is disposed within interior 23 in a generally horizontal plane. Grille 96 is disposed between the top 24 and the bottom 26 of the housing 22 and, in particular, is disposed between the housing's tumbler portion 28 and stripping portion 30, as shown in FIG. 10. Referring back to FIG. 2, the grille is configured to cover opening 38 of the flange 31. Grille 96 has an annular peripheral portion 97 which abuts against shoulder 37 of the flange 31. Thus, the grille is shaped and configured such that plant matter located within the tumbler portion 28 must pass through the grille in order to enter the stripping portion 30 of the housing.

Grille 96 has a plurality of spaced-apart, connected together annular bars 98 that are concentric with one another. The annular bars are connected together by a plurality of spaced-apart, radially extending elongate bars 100 which overlay annular bars 98. The elongate bars are configured to deflect plant parts upwards. Thus, when flowers, for example, hit one of the elongate bars 100, the flowers are turned around on the grille 96, and the tumbler members 56 turn the flowers yet further again until the flowers hit yet another of the elongate bars, where the process repeats. Grille 96 is shaped to selectively enable leaves to at least partially pass therethrough while preventing an operator's fingers from passing therethrough. The grille is also shaped to inhibit buds, hops and the like, that the operator wants to isolate, from passing through the grille. Referring to FIG. 4, the tumbler members 56 are shaped such that their second ends 60 abut the grille 96.

Figure 6:
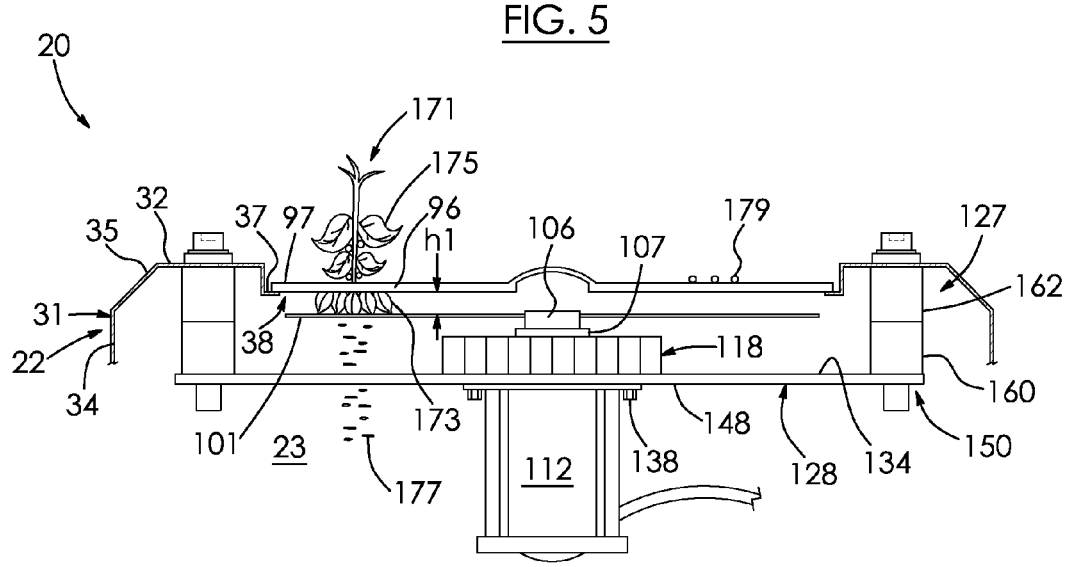
FIG. 6 is an assembled, partially simplified view of the grille, the string members, the stripping motor, and the height adjustment mechanism of the leaf stripper shown in FIG. 5, as well as the flange of the housing shown in cross-section.
Figure 9:
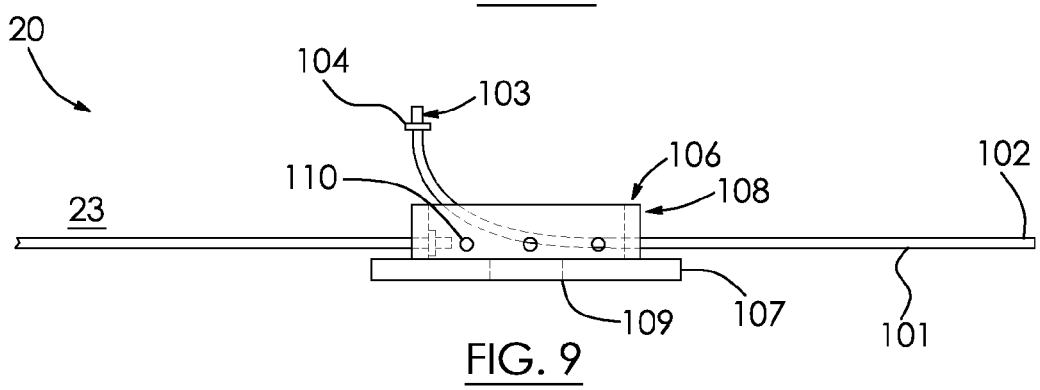
FIG. 9 is an elevation view of the hub shown in FIG. 8 with some of the string members connected thereto.

As seen in FIG. 2, the leaf stripper 20 includes a plurality of cutting members, in this example a plurality of rotatable, radially spaced-apart string member 101. In this example, each of the string members is a flexible monofilament line, though this is not strictly required. The string members 101 are disposed within the stripping portion 30 of the housing, and, as shown in FIG. 6, the string members are disposed adjacent to, spaced-apart from and below the grille 96, from the perspective of FIG. 6. Referring to FIG. 9, each string member has a first end 102 and a second end 103 opposite thereof. Each string member has a radially outwardly extending protrusion 104 at end 103. There may be between two to eight string members according to one preferred embodiment, though this range is not intended to be limiting, and in this example there are eight string members as best shown in FIG. 2. As the number of string members 101 is increased, so too will be increased the extent of suction caused by the string members for sucking leaves downwards.

Figure 8:
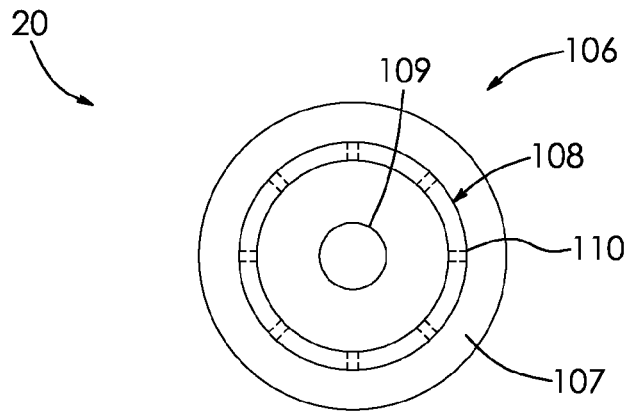
FIG. 8 is a top plan view of a hub upon which the string members shown in FIG. 5 are mounted.

The leaf stripper 20 has a hub 106 upon which the string members are mounted, as best shown in FIGS. 8 and 9. The hub has an annular shape and comprises a peripherally-disposed annular flange 107 and a central cylindrical connector portion 108 extending outwards therefrom. A central aperture 109 extends through flange 107 and connector portion 108. Hub 106 has a plurality radially spaced-apart apertures 110 extending through connector portion 108. There may be between two to eight apertures 110 according to one preferred embodiment, though this is not strictly required, and in this example the hub has eight apertures 110. The apertures are shaped to enable ends 102 of the string members 101 to pass therethrough and to inhibit protrusions 104 from passing therethrough. Each of the string members 102 connects to the hub, with protrusions 104 abutting portions of the connector portion 108 adjacent to apertures 110, and extends through and radially outwards from respective ones of the apertures 108 of the hub. As the string members are rotated radially, centrifugal force biases the string members outwards and away from the hub 106 and the string members are thus held in place via protrusions 104.

Figure 5:
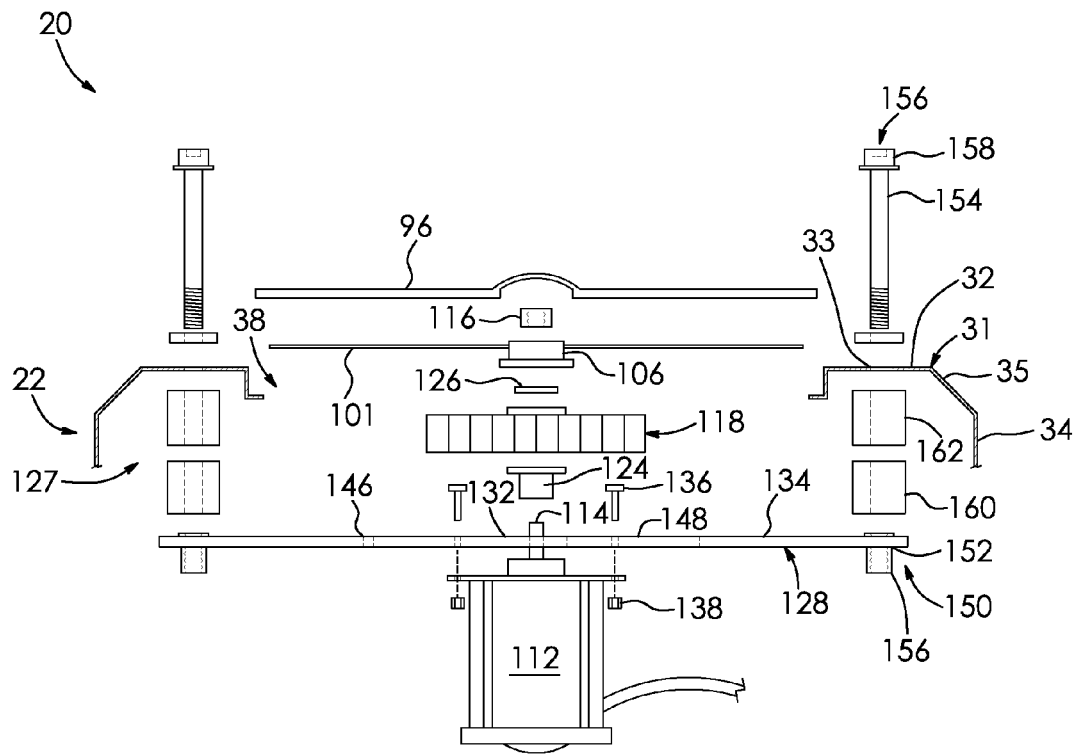
FIG. 5 is an exploded, disassembled, partially simplified elevation view of a grille, string members, a stripping motor, and a height adjustment mechanism of the leaf stripper shown in FIG. 4, as well as a flange of the housing shown in cross-section.

Referring back to FIG. 2, the leaf stripper 20 has a stripping motor 112 disposed within the stripping portion 30 of the housing within interior 23 and supported by the housing 22. Referring to FIG. 5, the stripping motor includes a shaft 114. The string members 101 are connected to stripping motor 112 via the hub 106, which operatively receives and connects with shaft 114 via the hub's aperture 109 shown in FIG. 8. A nut 116 is used to secure the hub 106 in place in this example by threadably connecting to shaft 114.

Advantageously, the string members 101, as rotated by the stripping motor 112, are configured to create a partial vacuum within the interior 23 of the housing 22 for at least partially sucking the leaves 175 as shown in FIG. 6 through the grille 96 from the tumbler portion to the stripping portion 30 of the housing. The string members 101 are also configured to at least partially shred the leaves at least partially passing through the grille 96. The string members rarely if ever need cleaning because plant parts and/or resin does not attach to the string members.

Referring now to FIG. 2, the leaf stripper 20 has a power and speed controller or speed adjusting means 117 for controlling the speed at which the stripping motor 112 rotates the string members 101. The speed of the motor is adjusted by adjusting the current or voltage fed to the motor, though this is not strictly required and other ways of adjusting motor speed are possible. Controller 117 is conventional and incorporates off-the-shelf components. In this example, it is a Speed Master (trademark) model having dial router speed control with a fuse and it may be purchased at hydroponic shops in Quebec, Canada. Controller 117 will therefore not be described in further detail.

As the speed with which the string members rotate increases, the string members become relatively stiffer. Put another way, as the speed at which the motor rotates the string members increases, the string members become more rigid due to centrifugal force. Thus, by reducing the speed of rotation, advantageously, the relative stiffness and tension of the string members may be reduced as desired, which may be particularly useful for removing plant crops from more fluffy plants. This is in contrast to leaf strippers of the known prior art that use blades, where the stiffness and rigidity of the blades may remain the same regardless of the speed with which the blades rotates. Thus, the use of machines using blades may render it difficult to selectively remove leaves from plants that are very fluffy, for example, without also losing the plant's crop.

The leaf stripper 20 also has a motor cooling fan 118 that is radially outwardly extending. The motor cooling fan includes a closed top 120 facing the grille. As shown in FIG. 6, the string members 101 are spaced-apart from and disposed between the grille 96 and the closed top 120 of the motor cooling fan 118. Referring back to FIG. 2, the top 120 of the fan is configured to inhibit interaction between the motor cooling fan 118 and leaves passing through the grille 96. The motor cooling fan also includes a plurality of radially extending and spaced-spaced-apart vanes 122 configured to cool the stripping motor 112 as the motor rotates. Referring to FIG. 5, motor cooling fan 118 is connected to shaft 114 of the motor via collar 124. As seen in FIG. 6, the fan is interposed between flange 107 of the hub 106 and motor 112 in this example. A washer 126 shown in FIG. 5 is disposed between hub 106 and fan 118. The manner in which and parts with which the hub and motor cooling fan connect to the motor are well known and conventional and therefore will not be described in further detail.

The leaf stripper 20 has a height adjustment mechanism 127. The height adjustment mechanism includes a stripping motor mount 128, as best shown in FIG. 2. The stripping motor mount is generally cross-shaped in this example. Stripping motor mount 128 has a central portion 130 with an aperture 132 centrally extending therethrough. Referring to FIG. 5, motor 112 connects to the central portion of the mount 128 via bolts 136 and nuts 138 in a conventional manner, such that shaft 114 of the motor coaxially aligns with and extends through aperture 132 of the mount. As best shown in FIG. 2, the leaf stripper 20 includes a motor shield in this example comprising a pair of u-shaped brackets 140 having a cross-shaped end 142 configured to receive the motor 112 and an open end 144 configured to threadably connect to the central portion 130 of the mount 128 via apertures 146 of the mount.

The stripping motor mount 128 has a plurality of radially spaced-apart arms 134 extending outwards from the central portion 130. The arms each have a proximal end 148 adjacent to the central portion 130 and a distal end 150 spaced-apart from the end 148. As shown in FIG. 5, each arm 134 has an aperture 152 extending therethrough adjacent to its distal end 150. Arms 134 are shaped such that apertures 152 align with apertures 33 of the flange 31.

The height adjustment mechanism 127 includes a pair of threaded members, in this example, bolts 154. The bolts 154 have hexagonal apertures 156 at their heads 158. Mount 128 threadably connects to flange 31 via the bolts 154 and nuts 156 disposed within apertures 152 of the mount 128. The nuts are connected to the mount 128 via welding in this example.

The height adjustment mechanism 127 further includes spacer sleeves 160 made of polyethelene cushions in this example and elastomeric sleeves, in this example, rubber sleeves 162, adjacent thereto. The sleeves 160 and 162 are configured to enable the bolts 154 to extend therethrough respectively. The sleeves are at least partially disposed between the grille 96 and the motor mount 128. Rubber sleeves 162 are configured to bias the string members 101 away from the grille. The rubber sleeves are also configured to bulge outwards as the string members 101 are brought closer to the grille 96 by tightening the bolts 154, as shown in FIG. 7.

Figure 7:
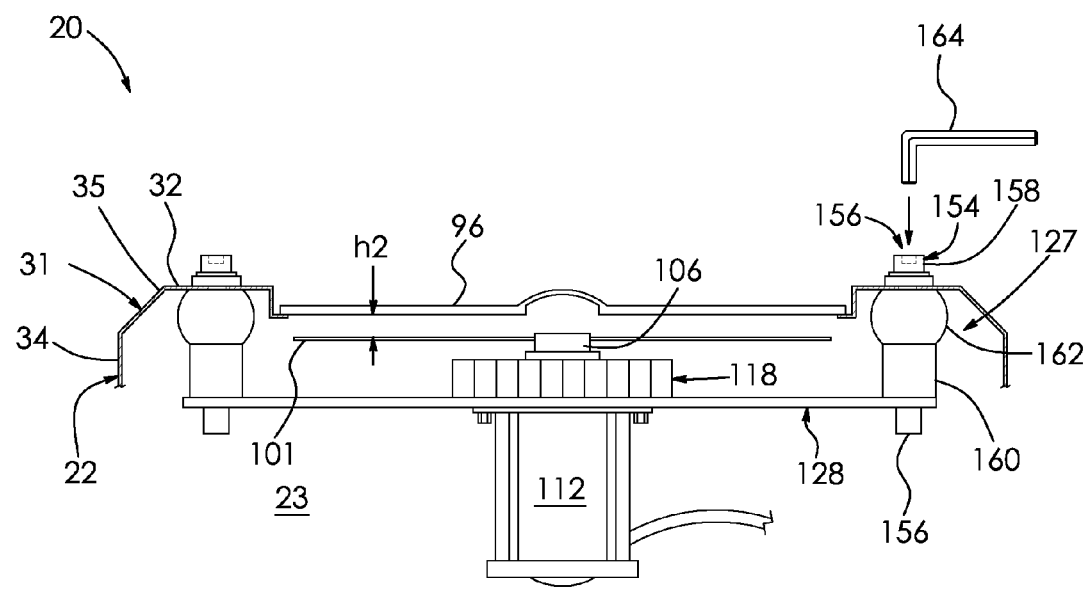
FIG. 7 is an assembled, partially simplified view of the grille, the string members, the stripping motor, and the height adjustment mechanism of the leaf stripper shown in FIG. 6, with the distance between the string members and the grille being reduced relative to that shown in FIG. 6.

Thus, with reference to FIGS. 6 and 7, the height adjustment mechanism 127 is configured such that adjustment of the bolts 154, in this example via a hex or Allen key 164 engaging apertures 156, adjusts the height h between the top of the string members 101 and the bottom of the grille 96. Height $h_1$ shown in FIG. 6 is greater than height $h_2$ shown in FIG. 7, which shows the rubber sleeves 162 in their bulging outwards state. Advantageously, this allows the operator to optimize the cutting and suctioning functions of the leaf stripper as desired. For example, the height adjustment mechanism advantageously enables the operator to selectively isolate crops that from plants that are very hard, very soft or very fluffy. In one preferred embodiment, height h is equal to $\frac{1}{8}^{th}$ of an inch.

Referring now to FIGS. 2 and 10, the leaf striper 20 includes an output opening 176 extending through the tumbler portion 28 of the housing. The output opening is aligned with and is disposed above the grille 96. Output opening 176 is also aligned with the tumbler portion 28 of the housing. The leaf stripper 20 has an output gate 166 for retrieving portions of the plant that have leaves at least partially removed upon the gate being opened. The output gate in this example is a sliding gate slidably mounted to the tumbler portion 28 of the housing via a pair of spaced-apart rails 168. Referring to FIG. 10, the gate 166 has a handle 170 and is moveable from an open position 172, shown in broken lines, to a closed position 174. The gate 166 is configured to selectively cover the opening 176. When the gate 166 is in the open position 172, the operator may retrieve portions of the plants that are at least partially removed of leaves from the leaf stripper. The gate 166 in its closed position 174 inhibits parts of the plant disposed within the leaf stripper 20 from exiting therefrom via the opening 176. The leaf stripper includes a removable chute 178 configured to connect with portions of the housing 22 adjacent to the opening 176. Parts of the plant stripped of leaves pass through the chute 178. A bucket or container may be disposed below the chute to collect these parts of the plant stripped of leaves.

In operation and referring to FIGS. 2 and 6, when a plant 171, shown in FIG. 6, is inserted through opening 49 to the tumbler portion 28 of the housing, it is tumbled around by the tumbler members 56. Gate 166 shown in FIG. 10 is in its closed position. Referring to FIG. 6, the string members 101 create a suction which causes parts 173 of the plant's leaves 175 to at least partially pass through the grille 96 and get cut by the string members. Leaf portions 177 so cut fall via gravity to the composting portion 48 of the housing shown in FIG. 1, which enables these portions 177 of the plant to slowly compost. The speed at which the tumbler members 56 and string members 101 rotate may be adjusted via controllers 94 and 117, respectively, shown in FIG. 2. The plant continues to be tumbled, with the shape of the tumbler members 56 as well as the shape of collar 52 of the gate 50, shown in FIG. 3, causing plant portions to tumble around within the tumbler portion 28. The operator may periodically look within the leaf stripper by opening gate 50, for example, to gauge the progress of the leaf stripping. Once the operator is satisfied with the extent of leaf stripping, gate 166 is opened and crop portions 179 of the plant shown in FIG. 6, such as buds, herbs, hops, and/or other such flowers, now largely stripped of leaves, tumble out of the stripper.

Figure 11:
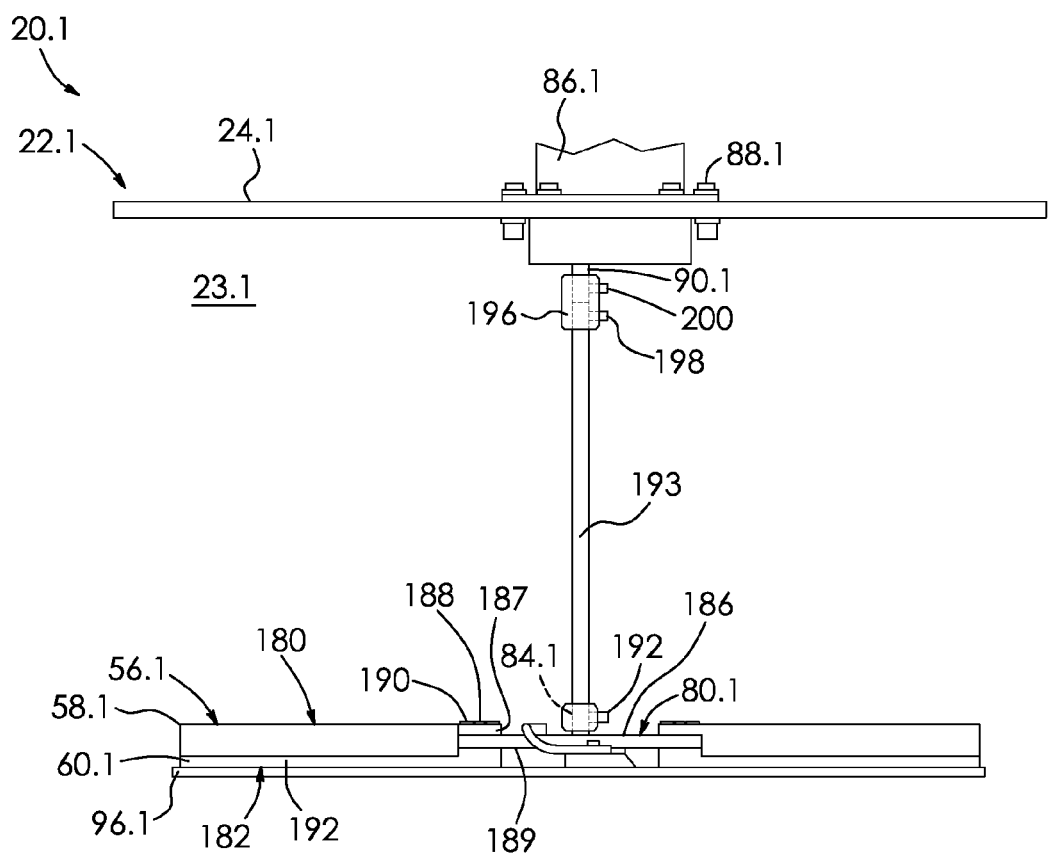
FIG. 11 is an elevation view of the top of a housing of a leaf stripper, the interior of part of its housing, a grille, a tumbler motor in fragment and a plurality of tumbler members according to a second embodiment, with the tumbler portion of the housing being removed.
Figure 12:
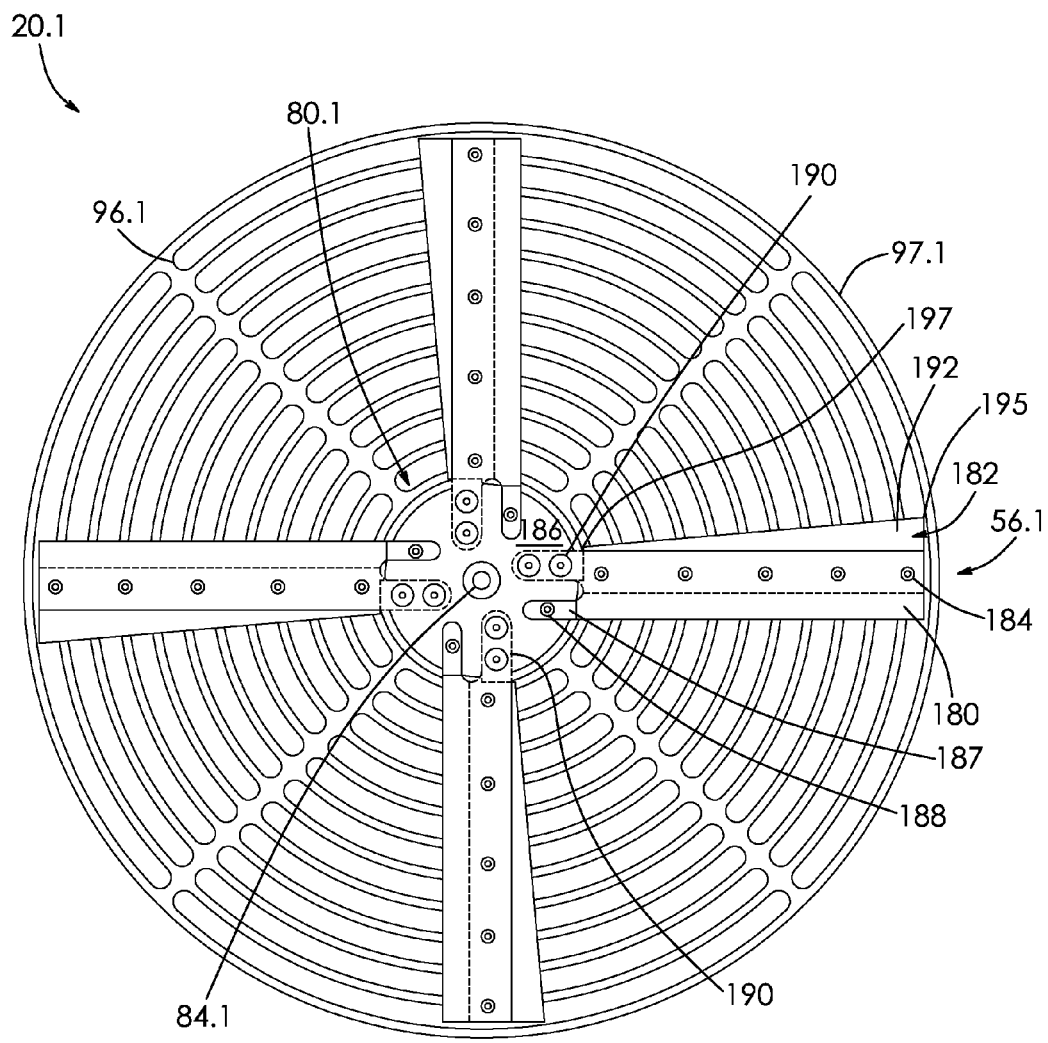
FIG. 12 is a top plan view of the grille and tumbler members shown in FIG. 11.
Figure 13:
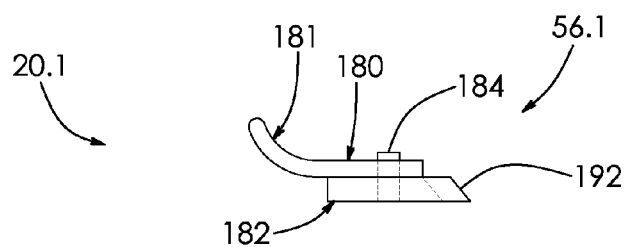
FIG. 13 is an end elevation view of one of the tumbler members shown in FIGS. 11 and 12.

FIGS. 11 to 13 show part of a leaf stripper 20.1 according to a second embodiment. Like parts have like numbers and function as the embodiment shown in FIGS. 1 to 10 with the addition of "0.1". Leaf stripper 20.1 is substantially the same as the leaf stripper 20 shown in FIGS. 1 to 10 with the exception of its tumbler arrangement. Tumblers 56.1 are relatively narrow and are primarily disposed adjacent to grille 96.1. The tumblers each comprise two parts: an elastomeric part in this example an elongate rubber member 180 and a rigid part, in this example an elongate UHMV poly alloy member 182, connected together via plurality of rivets 184 as shown in FIGS. 12 and 13. Each of the members is rectangular and blade-like in shape. As seen in FIG. 13, rubber members 180 in cross-section each have a curved upwardly sloping portion 181 which causes portions of the plant hitting the tumbler members 56.1 to be lifted upwards. Referring to FIG. 12, each of the rubber members 180 is connected to the top 186 of the hub 80.1 via a respective connector tab 187 and rivet 188. The rubber members are configured to lift plant portions upwards from below and their shape and rubber material are configured to ensure that the plant portions are tumbled relatively softly so as to inhibit damage to the non-leaf parts of the plant. Alloy members 182 are connected to the bottom 189 of the hub 80.1, shown in FIG. 11, via rivets 190. As shown in FIG. 13, each alloy member 182 has a tapered edge 192 configured to deflect and lift plant parts such as flowers upwards. As shown in FIG. 12, each of the edges 192 has a wider end 195 disposed adjacent to the annular peripheral portion 97.1 of the grille and a narrow end 197 disposed adjacent to the hub 80.1 or center of the grille. This causes the flowers to be gently turned on the grille such that the flowers are raised above the rubber members 180 without having any rubber passing on top of the flowers.

Sloping portions 181 of the rubber members and edges 192 of the alloy members are spaced-apart and are opposite to each other in this example. Tumblers 56.1 thus provide a double action of lifting and gently tumbling the plant, which may be ideal for hop flowers, for example.

Referring to FIG. 11, shaft 193 extends through central aperture 84.1 of the hub 80.1 and is secured to the hub by a set screw 192. Shaft 193 also connects to shaft 90.1 of the tumbler motor 86.1 via a collar 196 and a pair of set screws 198 and 200.

Figure 14:
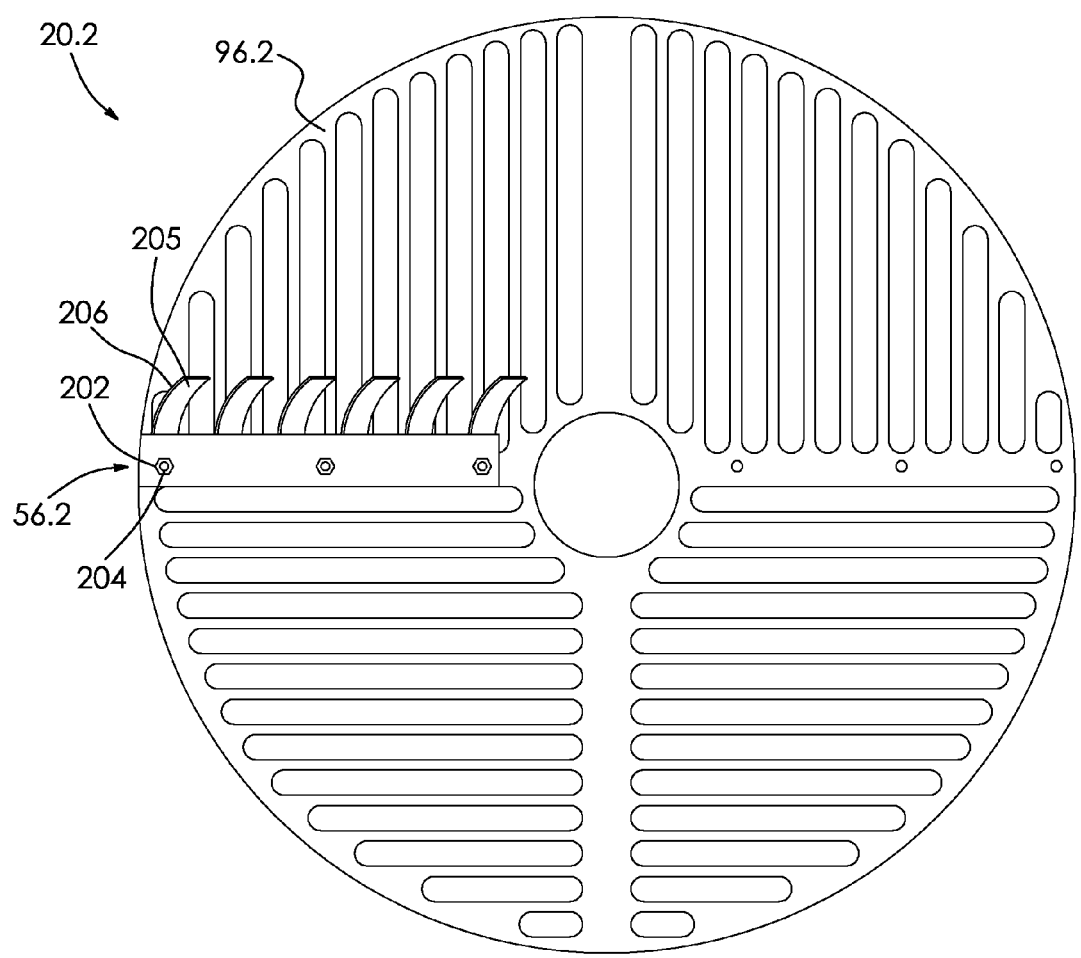
FIG. 14 is a top plan view of a grille and a tumbler member connected thereto according to a third embodiment.
Figure 15:
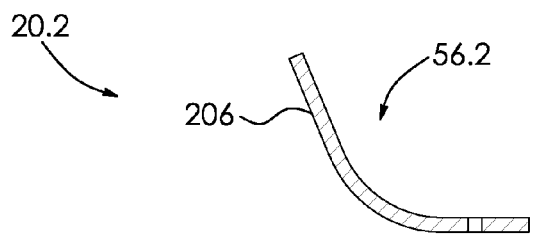
FIG. 15 is an end elevation view of the tumbler member shown in FIG. 14.

FIGS. 14 and 15 show a leaf stripper 20.2 according to a third embodiment. Like parts have like numbers and function as the embodiment shown in FIGS. 1 to 10 with the addition of "0.2". Leaf stripper 20.2 is substantially the same as leaf stripper 20 shown in FIGS. 1 to 10 with one exception being that it does not include a tumbler motor. Rather, leaf stripper 20.2 has a single tumbler member 56.2 that is connected to the grille 96.2 via a plurality of bolts 204 that pass through a plurality of apertures extending through grille 96.2 and threadably connect with nuts 202. The tumbler member 56.2 comprises a plurality of spaced apart teeth 205 each having a bent portion 206 that extends upwards from the perspective of the stripper and FIG. 15. The teeth also extend towards the center of the grille 96.2 as shown in FIG. 14. The tumbler 56.2 is configured to deflect and tumble plant parts upwards. Stripper 20.2 is manually operated in part, with the operator passing parts of the plant through the tumbler member 56.2, while the string members and stripping motor, similar to those shown in FIGS. 2 and 5 to 7, continue to operate.

Figure 16:
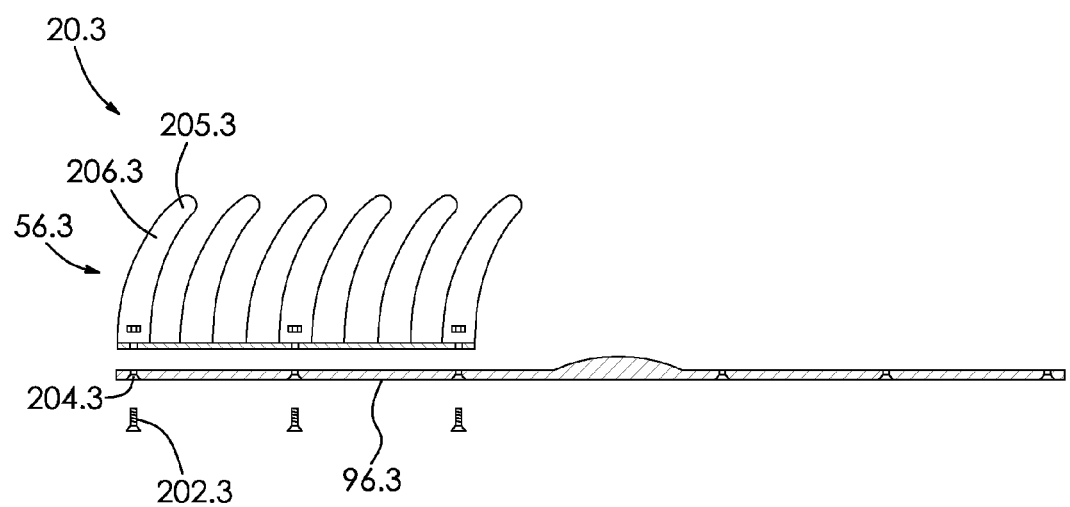
FIG. 16 a side elevation view of a tumbler member and a grille in cross-section according to a fourth embodiment.

FIG. 16 shows a leaf stripper 20.3 according to a fourth embodiment. Like parts have like numbers and function as the embodiment shown in FIGS. 14 and 15 with numeral "0.3" replacing numeral "0.2" and being added where the numeral did not previously include a decimal extension. Leaf stripper 20.3 is substantially the same as leaf stripper 20.2 shown in FIGS. 14 and 15 with the exception that the tumbler member has a comb-like shape with a plurality of spaced-apart curved teeth 205.3.

It will be appreciated that many variations are possible within the scope of the invention described herein. It will also be understood by someone skilled in the art that many of the details provided above are by way of example only and are not intended to limit the scope of the invention which is to be determined with reference to the following claims.

What is claimed is:

1. A leaf stripper for removing leaves from a plant, the leaf stripper comprising:
   a housing having an interior;
   a grille supported by the housing and being in communication with the interior, the grille being shaped to selectively enable the leaves to at least partially pass therethrough;
   a stripping motor disposed within the interior of the housing and supported by the housing; and
   a rotatable string member operatively connected to the stripping motor, the string member being configured both to create a partial vacuum within the interior of the housing for at least partially sucking the leaves through the grille when rotated and to least partially shred the leaves at least partially passing through the grille.

2. The leaf stripper as claimed in claimed in claim 1 wherein the string member is a flexible monofilament line.

3. The leaf stripper as claimed in claim 1 wherein the housing includes a top, a tumbler portion adjacent the top, and a bottom opposite the top, the grille being disposed between the top and the bottom of the housing, and wherein the leaf stripper further includes a rotatable tumbler member disposed within the tumbler portion, the tumbler member being configured to tumble portions of the plant around the grille.

4. The leaf stripper as claimed in claim 3, further including a tumbler motor mounted to the top of the housing, the tumbler motor operatively connecting to the tumbler member for selectively rotating the tumbler member thereby.

5. The leaf stripper as claimed in claim 1, wherein the stripping motor has a shaft, wherein the leaf stripper further includes a hub mounted the shaft, the hub having a plurality of radially spaced-apart apertures, and wherein the leaf stripper includes a plurality of radially spaced-apart additional string members for shredding the leaves passing through the grille, said string member and additional string members connecting to the hub and extending through and outwards from respective said apertures of the hub.

6. The leaf stripper as claimed in claim 1, further including a radially extending motor cooling fan connected to the stripping motor, the motor cooling fan being configured to cool the stripping motor.

7. The leaf stripper as claimed in claim 1, wherein the string member is disposed in a position below the grille that is spaced-apart from and adjacent to the grille and wherein the leaf stripper further includes a height adjustment mechanism having a motor mount connected to the stripping motor and a threaded member, the motor mount being threadably connected to the housing via the threaded member, the height adjustment mechanism being configured such that adjustment of the threaded member adjusts the position of the string member relative to the grille.

8. The leaf stripper as claimed in claim 7, the height adjustment mechanism further including an elastomeric sleeve, the sleeve being disposed between the grille and the motor mount, and the threaded member extending through the sleeve, the sleeve being configured to bias the string member away from the grille and the sleeve being configured to selectively bulge outwards as the string member is brought closer to the grille via adjustment of the threaded member.

9. The leaf stripper as claimed in claim 1, wherein the leaf stripper further includes a speed adjusting means for controlling the speed at which the motor rotates the string member and wherein, as the speed at which the motor rotates the string member increases, the string member becomes more rigid due to centrifugal force.

10. A leaf stripper for removing leaves from a plant, the leaf stripper comprising:
   a housing having an interior, a top, a tumbler portion adjacent the top, a bottom opposite the top, an output opening extending through the housing and a stripping portion adjacent to the bottom;
   a grille disposed within the interior of the housing and supported by the housing, the grille being disposed in a generally horizontal plane between the tumbler portion and the stripping portion, the grille being shaped to selectively enable the leaves to at least partially pass therethrough, the output opening being aligned with the grille and the tumbler portion of the housing;
   a tumbler motor mounted to the top of the housing;
   a rotatable, radially extending, elongate tumbler member operatively connected to the tumbler motor and disposed within the interior of the housing, the tumbler member having at least one aperture extending therethrough, the tumbler member being configured to tumble portions of the plant around the grille;
   a stripping motor disposed in the stripping portion of and supported by the housing;
   a motor cooling fan connected to the stripping motor, the motor cooling fan being configured to cool the stripping motor; and
   a rotatable, flexible monofilament line operatively connected to the stripping motor, the flexible monofilament line being configured to create a partial vacuum within the stripping portion for causing the leaves to be at least partially sucked through the grille from the tumbler portion to the stripping portion when rotated and being configured to shred the leaves.

11. The leaf stripper of claim 10, further including an output gate covering the output opening and through which portions of the plant that are at least partially removed of leaves may be retrieved.

\* \* \* \* \*

UNITED STATES PATENT AND TRADEMARK OFFICE
CERTIFICATE OF CORRECTION

| | | |
|---|---|---|
| PATENT NO. | : 8,596,565 B2 | Page 1 of 1 |
| APPLICATION NO. | : 13/110729 | |
| DATED | : December 3, 2013 | |
| INVENTOR(S) | : Marc Fortin | |

It is certified that error appears in the above-identified patent and that said Letters Patent is hereby corrected as shown below:

In the Claims

Col. 10, Lines 55 - 63, should read as follows

5. The leaf stripper as claimed in claim 1, wherein the stripping motor has a shaft, wherein the leaf stripper further includes a hub mounted to the shaft, the hub having a plurality of radially spaced-apart apertures, and wherein the leaf stripper includes a plurality of radially spaced-apart additional string members for shredding the leaves passing through the grille, said string member and additional string members connecting to the hub and extending through and outwards from respective said apertures of the hub.

Signed and Sealed this
Eleventh Day of February, 2014

Michelle K. Lee
*Deputy Director of the United States Patent and Trademark Office*